US012551997B2

(12) United States Patent
Cheveralls et al.

(10) Patent No.: US 12,551,997 B2
(45) Date of Patent: Feb. 17, 2026

(54) HAND TOOL HAVING INTERCHANGEABLE GRIP

(71) Applicants: Daniel Cheveralls, Raleigh, NC (US); Peter Nguyen, Euless, TX (US); Benjamin Mosher, Columbus, OH (US); Bennett G. Records, Branford, CT (US)

(72) Inventors: Daniel Cheveralls, Raleigh, NC (US); Peter Nguyen, Euless, TX (US); Benjamin Mosher, Columbus, OH (US); Bennett G. Records, Branford, CT (US)

(73) Assignee: BLACK & DECKER, INC., CT (US)

( * ) Notice: Subject to any disclaimer, the term of this patent is extended or adjusted under 35 U.S.C. 154(b) by 474 days.

(21) Appl. No.: 18/182,102

(22) Filed: Mar. 10, 2023

(65) Prior Publication Data

US 2024/0300076 A1 Sep. 12, 2024

(51) Int. Cl.

| | |
|---|---|
| ***B25B 23/16*** | (2006.01) |
| ***B25G 1/10*** | (2006.01) |
| ***B25G 3/08*** | (2006.01) |
| ***B25G 3/12*** | (2006.01) |

(52) U.S. Cl.

CPC .............. *B25B 23/16* (2013.01); *B25G 1/102* (2013.01); *B25G 1/105* (2013.01); *B25G 3/08* (2013.01); *B25G 3/12* (2013.01)

(58) Field of Classification Search

CPC . B25G 1/02; B25G 1/105; B25G 3/12; B25G 3/08; B25B 23/16

USPC ............... 81/177.1, 489, 491, 492, 436–439; 16/430, 431, DIG. 24, DIG. 41

See application file for complete search history.

(56) References Cited

U.S. PATENT DOCUMENTS

| | | | | | |
|---|---|---|---|---|---|
| 1,493,165 | A * | 5/1924 | Schade | B25G 1/00 | 81/436 |
| 2,782,454 | A * | 2/1957 | Baer | B25G 1/10 | 16/431 |
| 2,871,899 | A * | 2/1959 | Coyle | B25B 23/16 | 81/177.1 |
| 4,458,420 | A * | 7/1984 | Davis | B26B 3/00 | 81/177.1 |
| 7,093,523 | B2 * | 8/2006 | Gamba | B25G 1/105 | 81/492 |
| 7,878,094 | B2 * | 2/2011 | Lin | B25G 1/043 | 81/177.2 |
| 2008/0276770 | A1 * | 11/2008 | Blum | B25B 15/02 | 81/436 |

* cited by examiner

*Primary Examiner* — Hadi Shakeri

(74) *Attorney, Agent, or Firm* — Jordan IP Law, LLC; Todd A. Vaughn

(57) ABSTRACT

One or more embodiments of the present disclosure relate generally to an interchangeable grip for a hand tool that facilitates a robust, serviceable connection between the interchangeable grip and a tool handle.

20 Claims, 16 Drawing Sheets

HAND TOOL HAVING INTERCHANGEABLE GRIP

TECHNICAL FIELD

One or more embodiments of the present disclosure relate generally to an interchangeable grip for a hand tool having for mounting on a tool handle and which facilitates a robust, serviceable connection between the interchangeable grip and the tool handle.

BACKGROUND

Hand tools generally include a plastic grip for a metal handle. During the life of the hand tool, the grip eventually suffers from degradation and operational wear, which reduces the performance of the hand tool. This situation, in turn, necessitates replacing the plastic grip. The connection between the plastic grip and the metal handle, however, does not lend itself to the removal of the plastic grip in the field of service Even when the metal handle is still functional. In this instance, the only way to replace the plastic grip is through the purchase of an entirely new hand tool, which can be costly to the user.

SUMMARY

In accordance with one or more example embodiments, an interchangeable grip for a hand tool is provided. The interchangeable grip, having a grip body that is formed from a polymer material, has a structural configuration designed to have a very close slip fit, instead of a press-fit associated with conventional designs.

In accordance with one or more example embodiments, an interchangeable grip for a handle member of a hand tool comprises one or more of the following: a grip body removably coupled to the handle member, the grip body having a cavity extending a length of the grip body to receive and cover at least a portion of a handle member, an aft end having an aft contact face, a plurality of radial grooves arranged on the aft contact face, and one or more internal mating ribs arranged on an inner wall within the cavity; and an end cap removably coupled to the aft end of the grip body and the handle to facilitate removal of the grip body from the handle member, the end cap having a plurality of raised circumferential ribs extending radially outward for spatial alignment with the radial grooves for receipt therein, an opening sized to receive a distal end of the handle member within the cavity, and one or more internal ribs extend radially inward towards the opening to couple the end cap to the handle member.

In accordance with one or more example embodiments, an interchangeable grip for a handle member of a hand tool comprises one or more of the following: a grip body configured for removable coupling to the handle member, the grip body having a cavity configured to receive and cover at least a portion of the handle member, a contact face at an end thereof, a plurality of grooves arranged on the contact face, and one or more internal ribs arranged on an inner wall within the cavity; and an end cap configured for removable coupling to the grip body and the handle to facilitate removal of the grip body from the handle member, the end cap having a plurality of ribs extending radially outward for spatial alignment with the grooves for receipt therein, an opening configured to receive the handle member within the cavity, and one or more internal ribs extending radially inward towards the opening to couple the end cap to the handle member.

In accordance with the interchangeable grip, a fastener is provided to extend through the end cap and at least partially through the channel for connection to the handle member to prevent longitudinal movement between the handle member and the grip body in an assembled position of the grip body on the handle member.

In accordance with the interchangeable grip, the fastener comprises a flat head cap screw having a threaded shaft portion that extends through the end cap for connection to the handle member.

In accordance with the interchangeable grip, the flat head cap screw comprises a head portion that engages an outer face of the end cap when the threaded shaft portion is threaded into a central bore of the handle member.

In accordance with the interchangeable grip, the grip body is formed having a unitary structure.

In accordance with the interchangeable grip, the unitary structure is formed, in whole or in part, of an overmolded material.

In accordance with the interchangeable grip, the overmolded material comprises an elastomeric material or a non-elastomeric material.

In accordance with the interchangeable grip, the grip body comprises a plurality of interconnected grip body sections.

In accordance with one or more example embodiments, a hand tool comprises one or more of the following: a handle member; and a grip body removably coupled to the handle member, the grip body having a cavity extending a length of the grip body to receive and cover at least a portion of the handle, a forward end having a forward contact face, an aft end having an aft contact face, a plurality of radial grooves arranged on the aft contact face, and one or more internal mating ribs arranged on an inner wall within the cavity; and an end cap removably coupled to the aft end of the grip body and the handle to facilitate removal of the grip body from the handle member, the end cap having a plurality of raised circumferential ribs extending radially outward for spatial alignment with the radial grooves for receipt therein, an opening sized to receive a distal end of the handle member within the cavity, and one or more internal ribs extend radially inward towards the opening to couple the end cap to the handle member.

In accordance with one or more example embodiments, a hand tool comprises one or more of the following: a handle member; and a grip body configured for removable coupling to the handle member, the grip body having a cavity configured to receive and cover at least a portion of the handle member, a contact face at an end thereof, a plurality of grooves arranged on the contact face, and one or more internal ribs arranged on an inner wall within the cavity; and an end cap configured for removable coupling to the grip body and the handle to facilitate removal of the grip body from the handle member, the end cap having a plurality of ribs extending radially outward for spatial alignment with the grooves for receipt therein, an opening configured to receive the handle member within the cavity, and one or more internal ribs extending radially inward towards the opening to couple the end cap to the handle member.

In accordance with the hand tool, the handle member comprises an intermediate region having an axial stop that engages the forward contact face to limits longitudinal advancement of the handle member in an assembled position of the handle member.

In accordance with the hand tool, the axial stop has an outer diameter that is greater than an outer diameter of the handle member at the grip region.

In accordance with the hand tool, the intermediate region has an outer surface with one or more forward axial grooves and one or more aft axial grooves that facilitate the mounting of the grip body thereon.

In accordance with the hand tool, the one or more forward axial grooves that receive the internal ribs of the end cap to prevent rotation of the grip body relative to the handle member during operation of the hand tool.

In accordance with the hand tool, the handle member comprises a grip region extending from the intermediate region for removable coupling to the grip body.

In accordance with the hand tool, a fastener is provided to extend through the end cap and at least partially through the channel for connection to the handle member to prevent longitudinal movement between the handle member and the grip body in an assembled position of the grip body on the handle member.

In accordance with the hand tool, the fastener comprises a flat head cap screw having a threaded shaft portion that extends through the end cap for connection to the handle member.

In accordance with the hand tool, the flat head cap screw comprises a head portion that engages an outer face of the end cap when the threaded shaft portion is threaded into a central bore of the handle member.

In accordance with one or more example embodiments, a hand tool comprises one or more of the following: a tool head; a handle member coupled to the tool head; a grip body removably coupled to the handle member, the grip body having a cavity extending a length of the grip body to receive and cover at least a portion of the handle, a forward end having a forward contact face, an aft end having an aft contact face, a plurality of radial grooves arranged on the aft contact face, and one or more internal mating ribs arranged on an inner wall within the cavity; and an end cap removably coupled to the aft end of the grip body and the handle to facilitate removal of the grip body from the handle member, the end cap having a plurality of raised circumferential ribs extending radially outward for spatial alignment with the radial grooves for receipt therein, an opening sized to receive a distal end of the handle member within the cavity, and one or more internal ribs extend radially inward towards the opening to couple the end cap to the handle member.

In accordance with one or more example embodiments, a hand tool comprises one or more of the following: a tool head; a handle member coupled to the tool head; a grip body configured for removable coupling to the handle member, the grip body having a cavity configured to receive and cover at least a portion of the handle member, a contact face at an end thereof, a plurality of grooves arranged on the contact face, and one or more internal ribs arranged on an inner wall within the cavity; and an end cap configured for removable coupling to the grip body and the handle to facilitate removal of the grip body from the handle member, the end cap having a plurality of ribs extending radially outward for spatial alignment with the grooves for receipt therein, an opening configured to receive the handle member within the cavity, and one or more internal ribs extending radially inward towards the opening to couple the end cap to the handle member.

In accordance with the hand tool, the handle member comprises an intermediate region having an axial stop that engages the forward contact face to limits longitudinal advancement of the handle member in an assembled position of the handle member.

In accordance with the hand tool, the axial stop has an outer diameter that is greater than an outer diameter of the handle member at the grip region.

In accordance with the hand tool, the intermediate region has an outer surface with one or more forward axial grooves and one or more aft axial grooves that facilitate the mounting of the grip body thereon.

In accordance with the hand tool, the one or more forward axial grooves that receive the internal ribs of the end cap to prevent rotation of the grip body relative to the handle member during operation of the hand tool.

In accordance with the hand tool, the handle member comprises a grip region extending from the intermediate region for removable coupling to the grip body.

DRAWINGS

The various advantages of one or more exemplary embodiments will become apparent to one skilled in the art by reading the following specification and appended claims, and by referencing the following drawings, in which:

Figure 10:
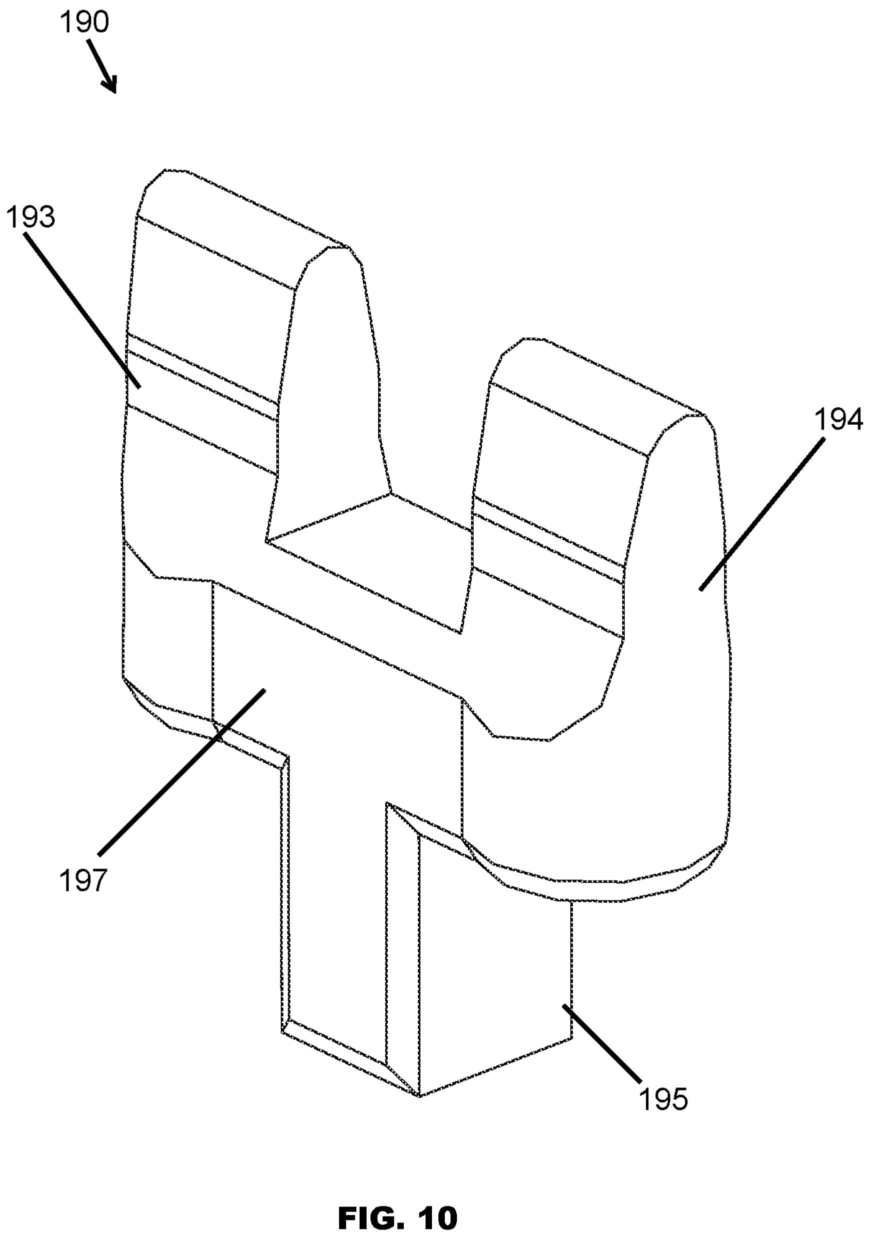
FIG. 10 illustrates a perspective view of the plunger of FIG. 7.
Figure 11:
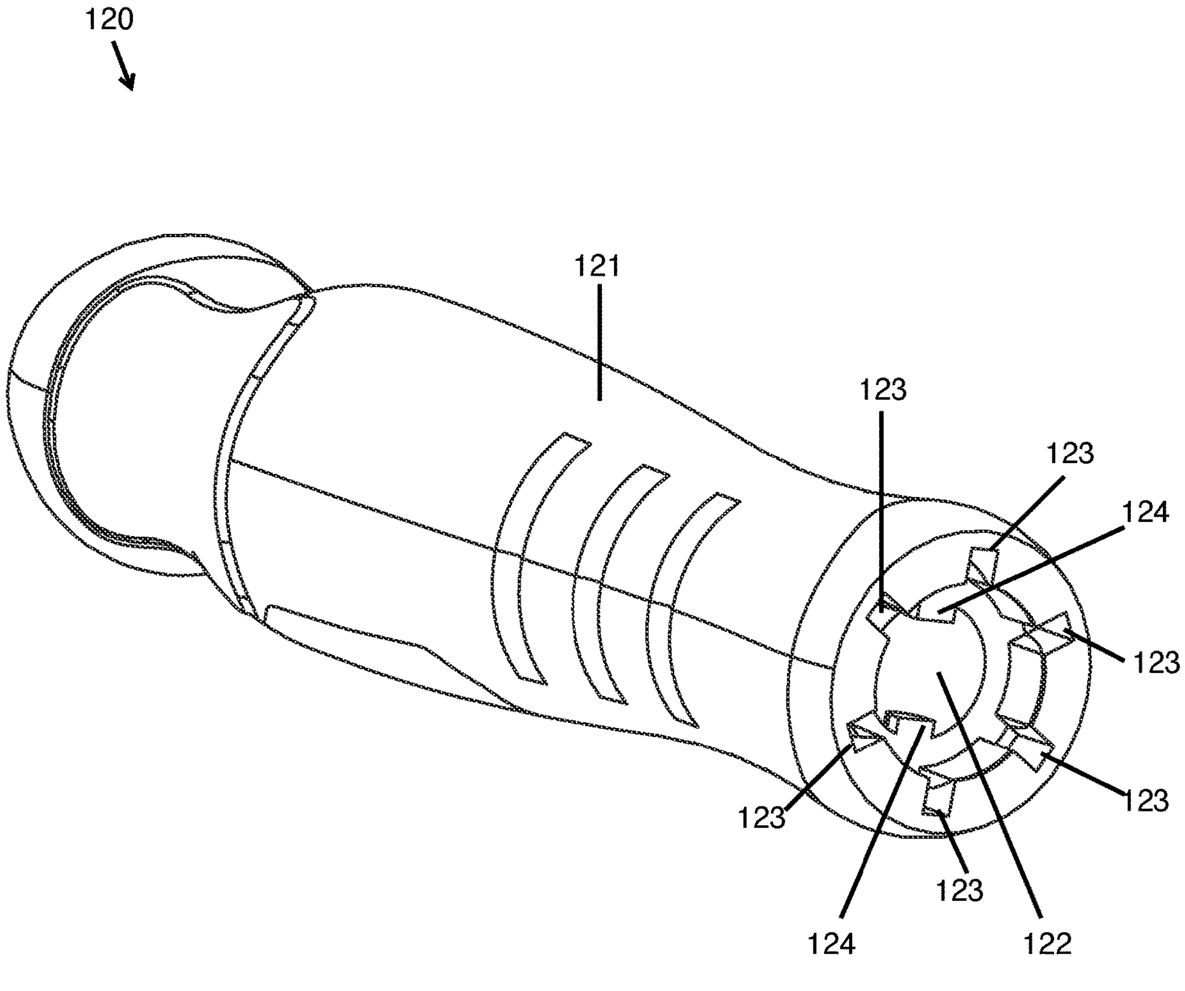
FIG. 11 illustrates a perspective view of a grip of the ratchet tool of FIG. 1.
Figure 12:
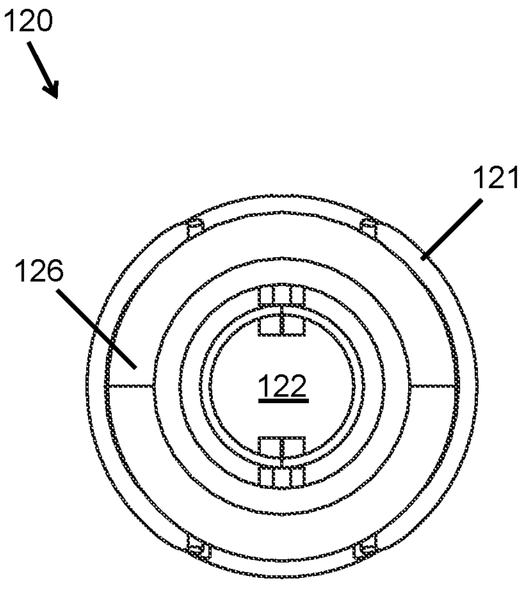
Figure 13:
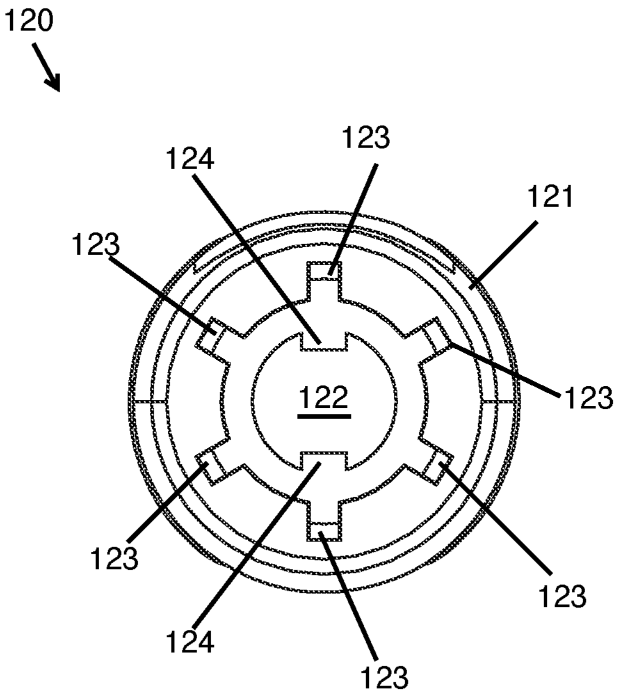

FIGS. 12 and 13 respectively illustrate a front view and a rear view of the grip of FIG. 10.

Figure 14:
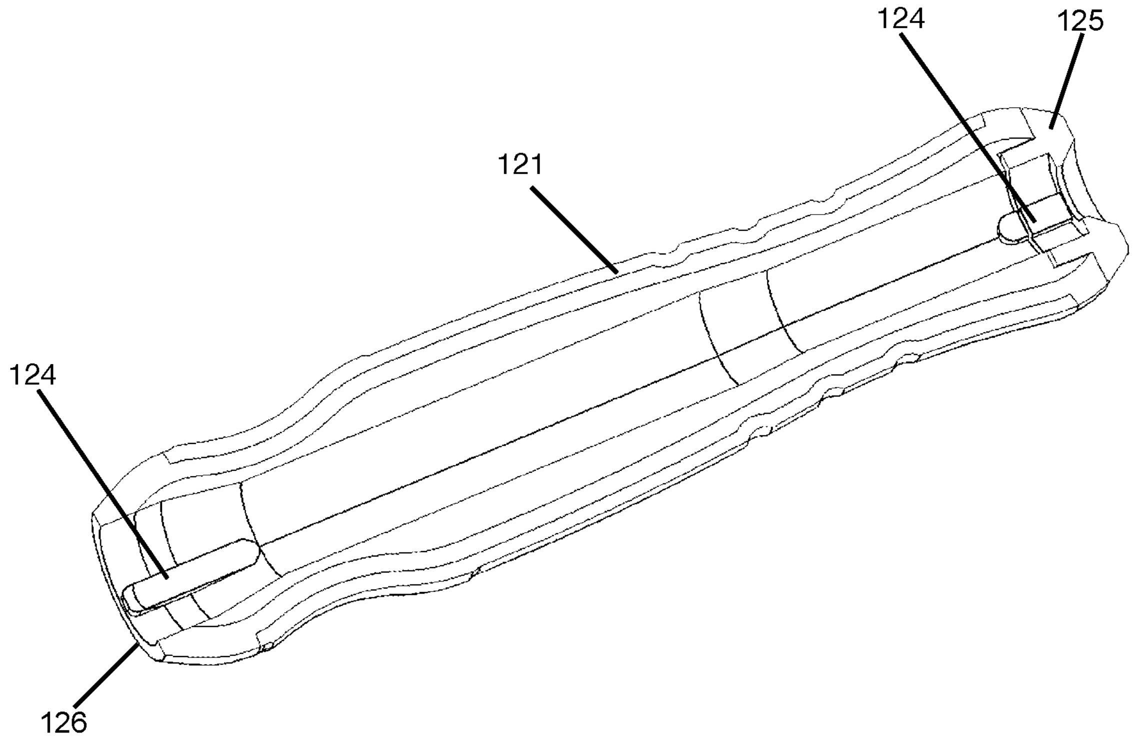

FIG. 14 illustrates a sectional view of the grip of FIG. 10.

Figure 1:
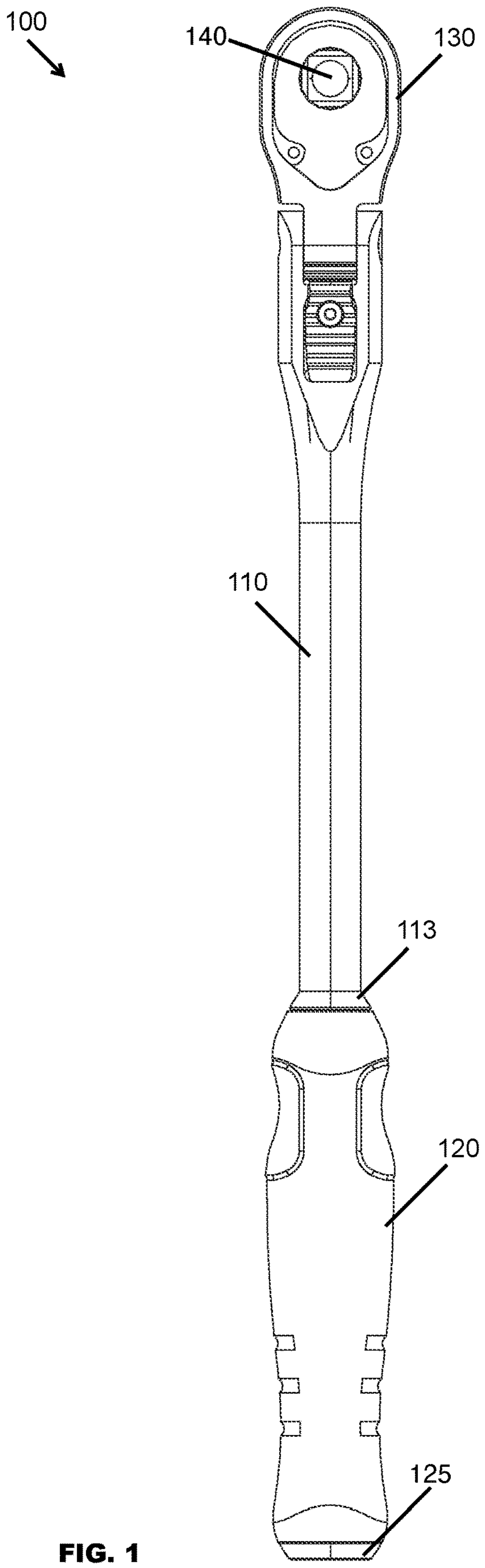
FIG. 1 illustrates a view of an example ratchet tool, in accordance with one or more embodiments set forth, shown, and described herein.
Figure 2:
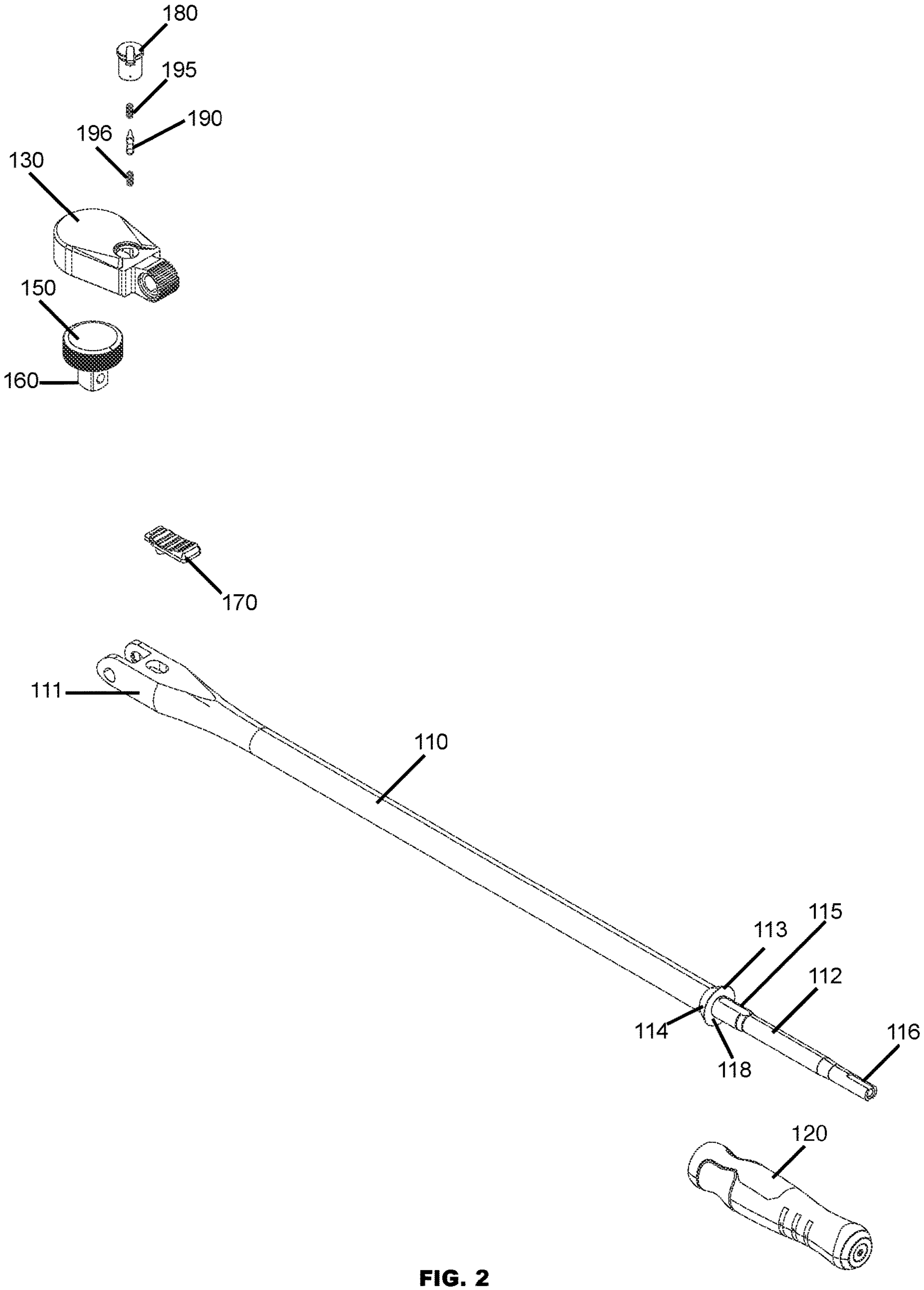
FIG. 2 illustrates an exploded view of the example ratchet tool of FIG. 1.
Figure 15:
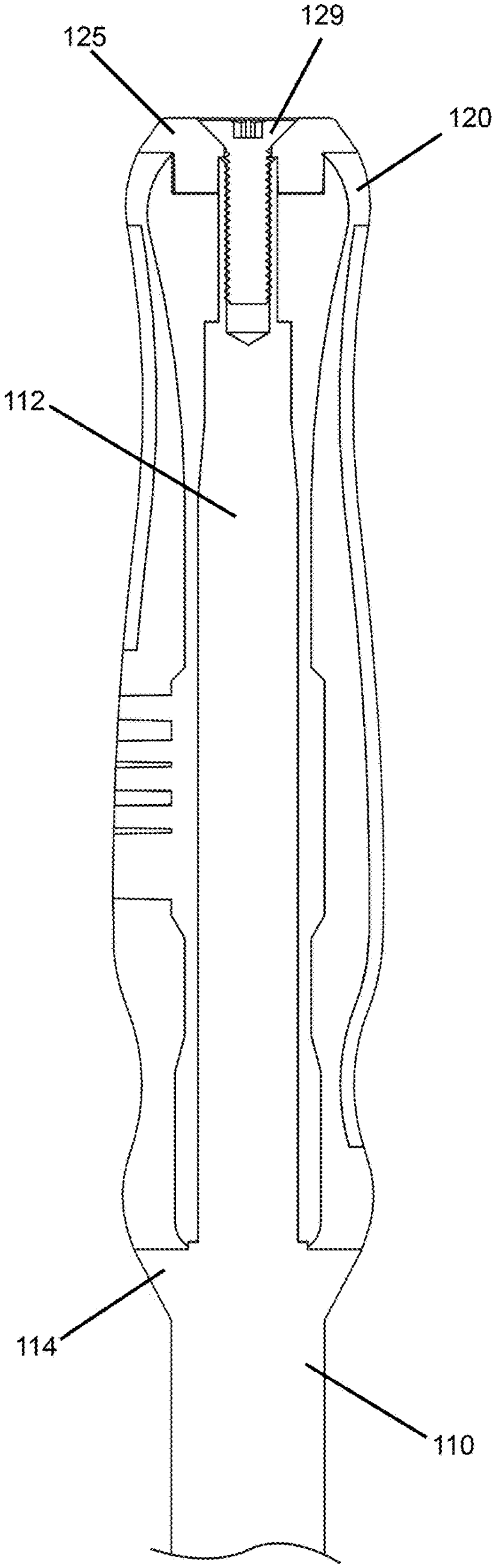

FIG. 15 illustrates a sectional view of view of an interlocking connection between the handle and the grip of the ratchet tool of FIG. 1.

Figure 16:
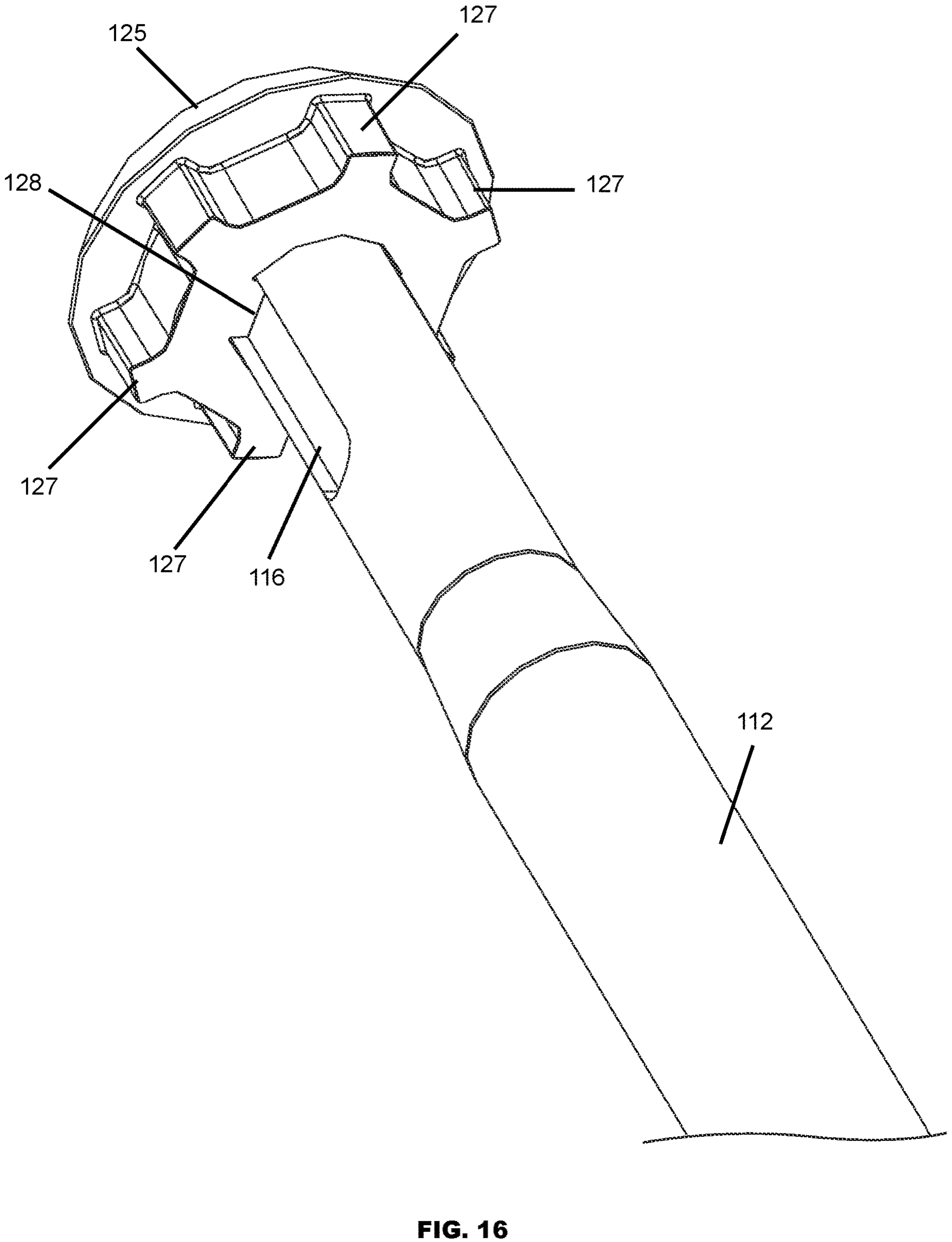

FIG. 16 illustrates a perspective view of a handle coupled to an end cap, in accordance with one or more embodiments set forth, shown, and described herein.

DESCRIPTION

Turning to the figures, which illustrates an example ratchet tool 100, in accordance with one or more embodiments. Although the illustrated example embodiments show implementation of a ratchet tool, embodiments are not limited thereto. This disclosure contemplates the tool being implemented as any suitable hand tool that falls within the spirit and scope of the principles of this disclosure.

The example ratchet tool 100 in accordance with one or more embodiments set forth, described, and/or illustrated herein comprises a drive assembly that includes a pawl, a control member, at least one bias member, and a plunger assembly that enables a user to apply sufficient torque when performing ratcheting operation to quickly and efficiently fasten and/or remove a mechanical fastener. The ratchet tool also comprises a removeable and interchangeable grip that enables the ratchet tool 100 to be field-serviceable for damage repair or customization by quickly replacing the grip with another suitable grip.

The ratchet tool 100 may comprise one or more operational elements. Some of the possible operational elements of the ratchet tool 100 are illustrated in the figures and will now be described. It will be understood that it is not necessary for the ratchet tool 100 to incorporate all the elements illustrated in the figures set forth, and/or described herein. The ratchet tool 100 may have any combination of the various elements illustrated herein. Moreover, the ratchet tool 100 may have additional operational elements to those illustrated in the figures.

As illustrated in FIG. 1, the example ratchet tool 100 comprises a handle member 110, a ratchet head 130 coupled to the handle member 110, and a drive assembly 140. A removeable and interchangeable grip 120 having a grip body 121 with a gripping surface that enables a user to maintain a grip of the handle member 110 when fastening and removing a mechanical fastener (e.g., bolt, nut, etc.) when engaged in a ratcheting operation.

As illustrated in FIGS. 2 and 10 through 14, the handle member 110 is tapered in a longitudinal direction thereof to define a ratchet region 111 that is coupled to the ratchet head 130 and a grip region 112 that is removably coupled to the grip 120. The outer diameter of the handle member 110 at the ratchet region 111 is greater than the outer diameter of the handle member 110 at the grip region 112. An intermediate region 113 of the handle member 110 serves as a transition between the ratchet region 111 and the grip region 112. Although the illustrated example embodiment shows the handle member 110 formed having a generally circular cross-sectional profile along its axial length, embodiments are not limited thereto. This disclosure contemplates the handle member 110 formed having any suitable geometric cross-sectional profile that falls within the spirit and scope of the principles of this disclosure. For example, the handle member 110 can be formed having a generally square cross-sectional profile, a generally rectangular cross-sectional profile, a generally oval cross-sectional profile, and any combinations thereof. In one example implementation of the handle member 110, the cross-sectional profile of the grip region 112 may, in whole or in part, have a generally rectilinear (square or rectangular) cross-sectional profile defining flat surfaces that correspond to the cross-sectional profile of the central bore/channel/cavity 122. In another example implementation of the handle member 110, the cross-sectional profile of the grip region 112 may, in whole or in part, comprise a pair of opposing curvilinear sidewalls and a pair of opposing rectilinear sidewalls.

The intermediate region 113 includes an axial stop 114 that limits further longitudinal advancement of the handle member 110 once the handle member 110 and/or the grip body 121 advances to a full operating or assembled position. The axial stop 114 has an outer diameter that is greater than the outer diameter of the ratchet region 111. The axial stop 114 has a structural profile that flares outwardly in a longitudinal direction to present a contact face 118 that directly engages a forward contact face 126 of the grip body 121 in the full operating or assembled position of the ratchet tool 100. The outer surface of the intermediate region 113 also includes locating grooves comprising one or more forward axial grooves 115 and one or more aft axial grooves 116 that facilitate the mounting of the grip 120 thereon. The forward axial grooves 115 and the aft axial grooves 116 prevent rotation of the grip body 121 in an assembled position. The forward axial grooves 115 has an elliptical profile or cross-section with a full radius at a front edge thereof which interfaces with corresponding forward internal ribs 124 of the grip body 121 to actively tension the handle member 110 and compensate for any clearance tolerances during assembly. In particular, the one or more forward axial grooves 115 align with internal ribs 124 that radially extend outwardly from an interior surface of the grip body 121. Each internal rib 124 is received in a corresponding one of the axial grooves 115 to prevent rotation of the grip body 121 relative to the handle member 110 during a ratcheting operation.

An exterior surface of the ratchet head 130 has a peripheral sidewall 131 that defines a first recessed surface comprising a drive gear pocket 132 and a second recessed surface comprising a pawl pocket 133. The handle member 120 may be formed by metal injection molding (MIM) that uses in whole or in part, a durable metal material. Such a durable metal material may comprise, for example, chrome. Embodiments, however, are not limited thereto, and thus, this disclosure contemplates the handle member 110 being formed of any suitable material that falls within the spirit and scope of the principles of this disclosure.

As illustrated in FIGS. 11 through 14, the grip body 121 is formed as a unitary structure which, in an assembly position, covers or otherwise encapsulates the grip region 112 of the handle member 110. The grip body 121 includes a central bore/channel/cavity 122 substantially extending throughout the axial length of the grip body 121. The central bore/channel/cavity 122 has a diameter that corresponds to the outside diameter of the grip region 112 to facilitate the receipt of the grip region 112 therein. Although the illustrated embodiment shows the grip body 121 is formed as a unitary structure, embodiments are not limited thereto. This disclosure contemplates the grip body 121 being formed having any structural configuration that falls within the spirit and scope of the principles of this disclosure. For example, the grip body 121 may be formed having a plurality of interconnected grip body sections. Moreover, although the illustrated example embodiment shows the central bore/channel/cavity 122 formed having a generally circular cross-sectional profile along its axial length, embodiments are not limited thereto. This disclosure contemplates the central bore/channel/cavity 122 formed having any suitable geometric cross-sectional profile that falls within the spirit and scope of the principles of this disclosure. For example, the central bore/channel/cavity 122 can be formed having a generally square cross-sectional profile, a generally rectangular cross-sectional profile, a generally oval cross-sectional profile, and any combinations thereof. In one example implementation of the grip body 121, the central bore/channel/cavity 122 may, in whole or in part, have a generally rectilinear (square or rectangular) cross-sectional profile defining flat surfaces that correspond to the cross-sectional profile of the handle member 110. In another example implementation of the grip body 121, the cross-sectional profile of the central bore/channel/cavity 122 may, in whole or in part, comprise a pair of opposing curvilinear sidewalls and a pair of opposing rectilinear sidewalls that correspond to the cross-sectional profile of the handle member 110.

The forward end of the grip body 121 includes the forward contact face 126 that is oriented in a plane which is perpendicular from the longitudinal axis of the grip body 121. In an assembled position, the forward contact face 126 is engaged by the axial stop 114. One or more internal mating ribs 124 are arranged on an inner surface or wall within the central bore/channel/cavity 122 for receipt in the forward axial grooves 115 of the intermediate region 113 of the handle member 110 to form an interlocking connection that prevents rotation of the grip body 121 relative to the handle member 110 during a ratcheting operation.

The aft end of the grip body 121 includes an aft contact face that is oriented in a plane which is perpendicular from the longitudinal axis of the grip body 121. The aft contact face has a plurality of symmetrically-spaced radial grooves 123 and the plurality of internal ribs 124 that located in the central bore/channel/cavity 122.

The grip body 121 can be formed in whole or in part, of an overmolded material that is shaped in a manner that accommodates the ergonomic demands of a user when using the ratchet tool 100 in a ratcheting operation. The overmolded material can comprise elastomeric or non-elastomeric materials, including, but not limited to polypropylene and/or thermoplastic rubber. Embodiments, however, are not limited thereto, and thus, this disclosure contemplates the grip body 121 being formed of any suitable material(s) that falls within the spirit and scope of the principles of this disclosure.

As illustrated in FIGS. 14 and 15, an annular washer or end cap 125 is coupled to a rear end of the grip 120 to secure the grip body 121 on the handle member 110. The end cap 125 includes a plurality of raised circumferential ribs 127 extending radially outward therefrom that are spatially aligned with the radial grooves 123 of the grip body 121 for receipt therein. The end cap 125 also includes an opening sized to receive the handle member 110 at the grip region 112. One or more internal splines or ribs 128 of the end cap 125 are located within the opening and extend radially inward towards the opening to be received in corresponding aft axial grooves 116 in an outer surface of the handle member 110.

A mechanical fastener is provided to further maintain the connection between the handle member 110 and the grip body 121. In the illustrated embodiment, the mechanical fastener comprises a flat head cap screw 129 having a threaded shaft portion that extends through a second opening of the end cap 125 (which is located coaxially with the opening in the end cap 125 configured to receive the handle member 110) for coupling with corresponding threads in a threaded central bore 117 at an aft face of the grip region 112, and a head portion that contacts an outer face of the end cap 125. The flat head cap screw 129 provides axial compressive force to retain the grip body 121 and remove any assembly clearance. Once assembled, a user may tighten the flat head cap screw 129, which simultaneously centers and tensions the grip body 121 onto the handle member 110 and takes up any clearance or stack-up tolerance between the grip body 121 and the handle member 110. After its tightening, the flat head cap screw 129 also prevents longitudinal movement between the handle member 110 and the grip 120.

By virtue of the connection between the end cap 125 and the grip body 121, and the end cap 125 and the handle member 110, rotation of the grip 120 relative to the handle member 110 during a ratcheting operation is prevented. A user may quickly and easily replace the grip 120 with a replacement grip by unscrewing the flat head cap screw 129, and manually separating the end cap 125 from the handle member 110 and the grip body 121. The grip body 121 may then be separated from the handle member 110, to permit its replacement with a replacement grip. Should, during use, the grip 120 becomes damaged, a user can easily and quickly replace the grip body 121 by unthreading the flat head cap screw 129 and axially sliding the grip body 121 off of the handle member 110. A new grip body 121 can then be fitted and the ratchet tool 100 returned to service without the need to warranty the entire ratchet tool 100. Should a user want to change the visual appearance of ratchet tool 100, the grip body 121 can also be interchanged with a similar grip body 121 of a different color, allowing previously unavailable opportunity for customization by the user.

Figure 3:
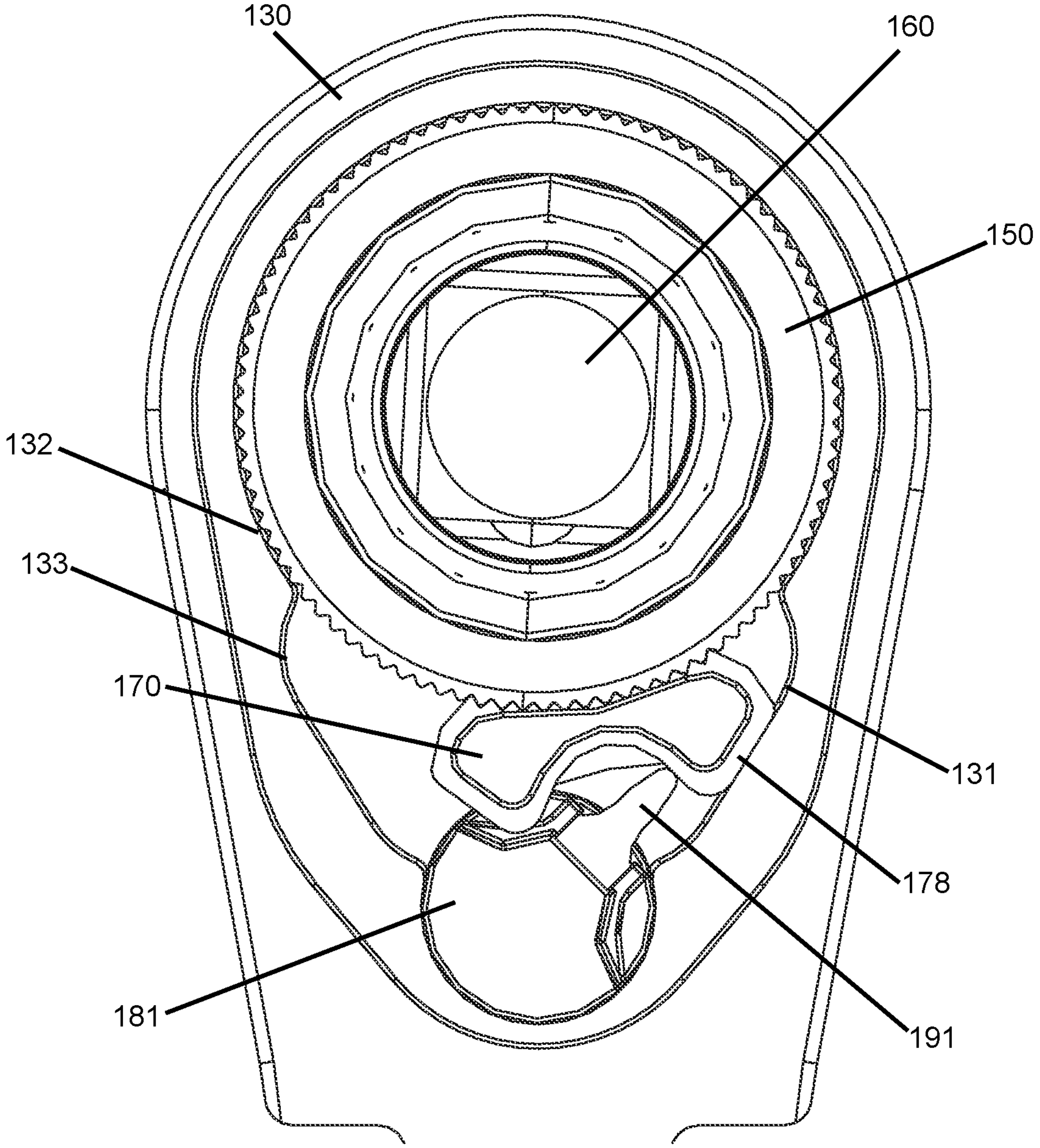
FIGS. 3 through 5 illustrate a view of a drive assembly of the example ratchet tool of FIG. 1.
Figure 4:
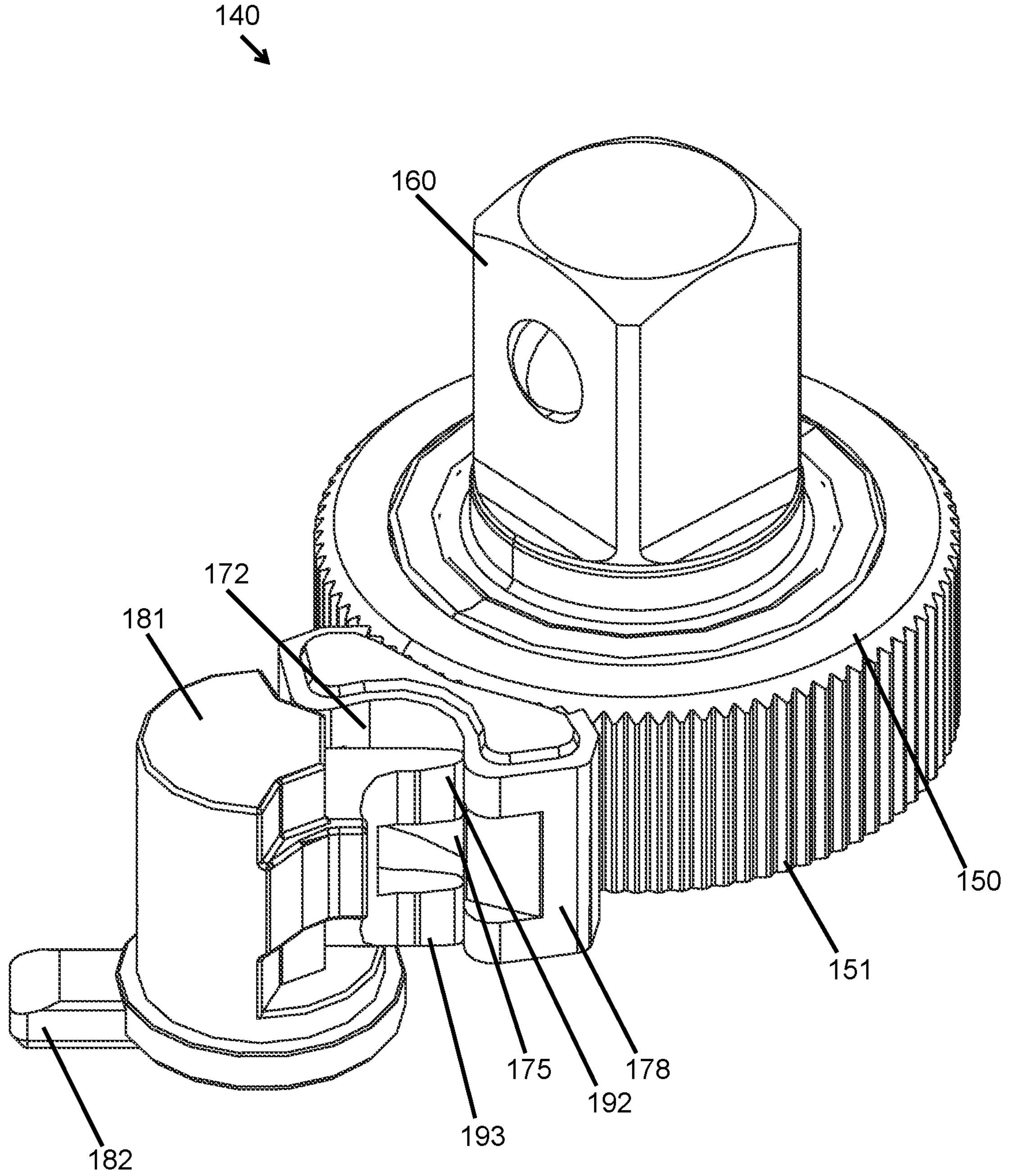
Figure 5:
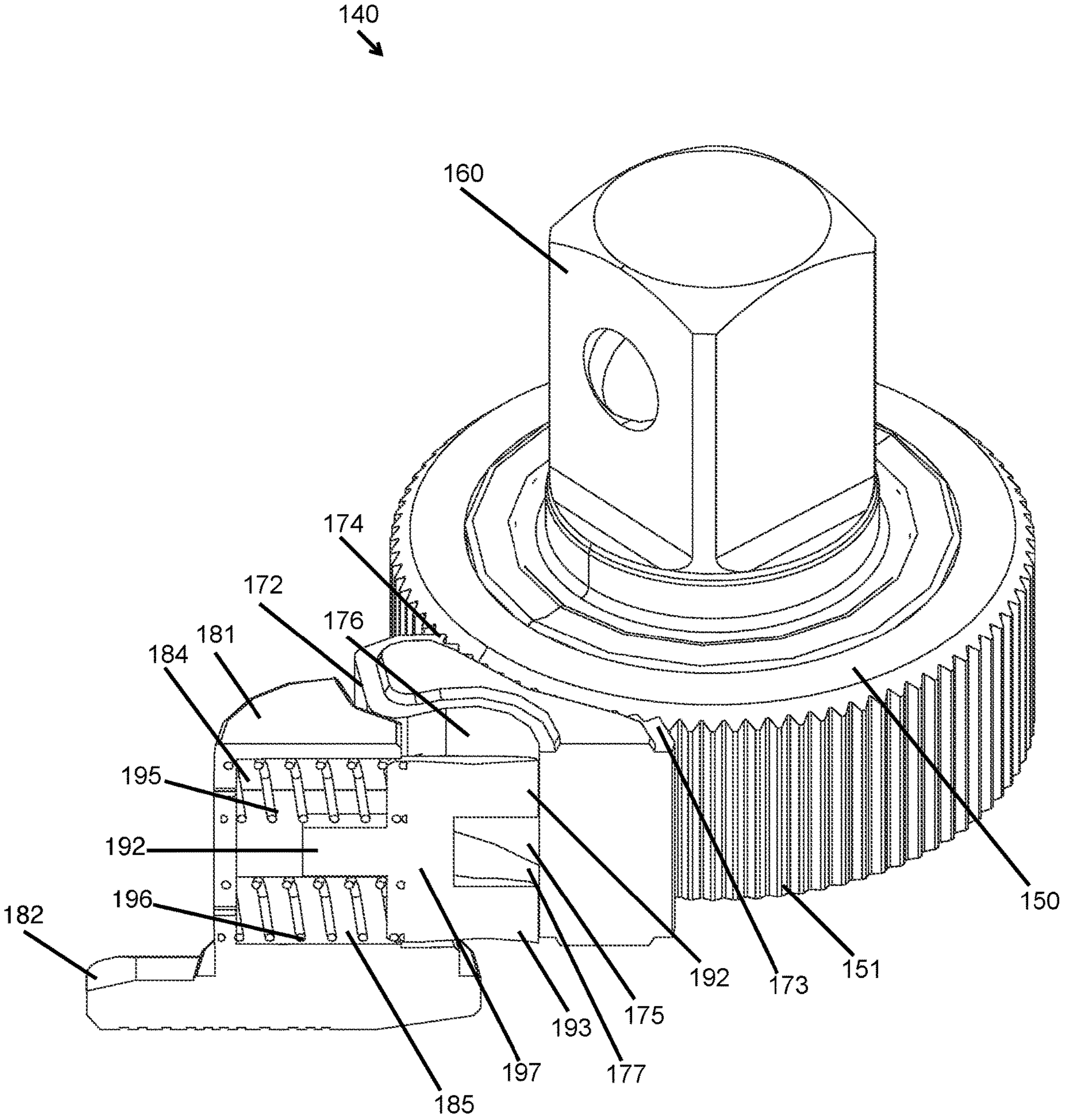

As illustrated in FIGS. 3 through 5, the drive assembly 140 comprises an annular drive gear 150, a drive lug 160 which is driven for rotation by the drive gear 150, a pawl 170, a control member 180, and a plunger assembly 190. The components of the drive assembly may be formed by metal injection molding (MIM) that uses in whole or in part, a durable metal material. Such durable metal materials includes, but is not limited to, steel and stainless steel. Embodiments, however, are not limited thereto, and thus, this disclosure contemplates the components of the drive assembly being formed of any suitable material that falls within the spirit and scope of the principles of this disclosure.

The drive gear 150 is mounted in the drive gear pocket 132 of the ratchet head 130 for rotation about a gear axis. The drive gear 150 has a ring shape or cross-section having a plurality of external gear teeth 151 radially extending from an outer periphery thereof.

The drive lug 160 is driven for rotation by the drive gear 150, and is operable to receive a tool component, including, but not limited to a socket or tool that enables the user to fasten and remove the mechanical fastener. Although the illustrated example embodiments feature the drive lug 160 formed as a male drive lug operable for connection to a female tool component, embodiments are not limited thereto. This disclosure contemplates the drive lug 160 having any structural configuration that falls within the spirit and scope of the principles of this disclosure. For example, the drive lug 160 may be formed as a female drive lug operable for connection to a male tool component.

Figure 6:
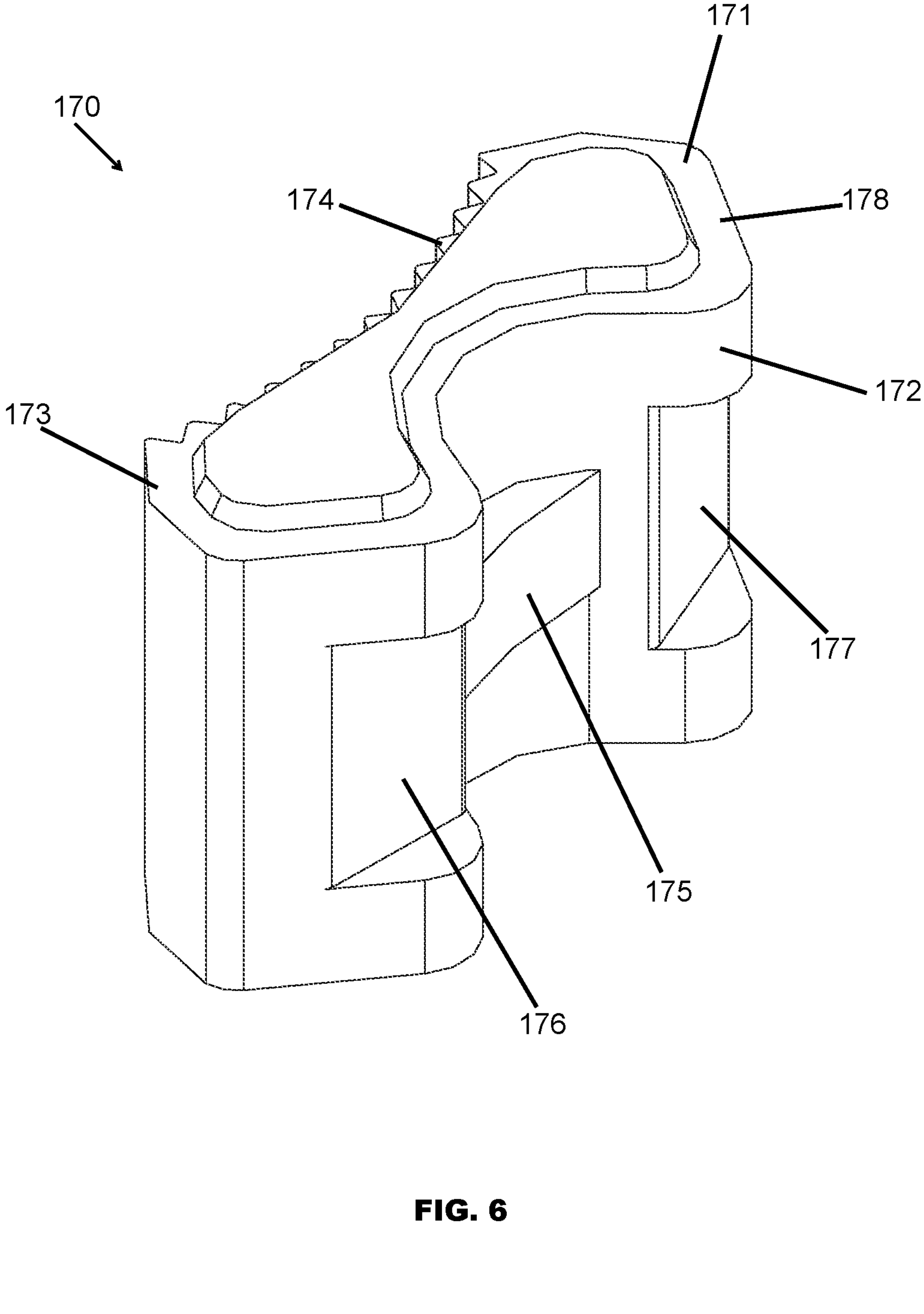
FIG. 6 illustrates a perspective view of a pawl for the example ratchet tool of FIG. 1.

As illustrated in FIGS. 3 and 6, the pawl 170 comprises a pawl body 171 mounted in the pawl pocket 133 of the ratchet head 130 for biased engagement with the drive gear 150. The pawl body 171 has a generally concave rear face 172 and a generally concave front face 173 with a plurality of external pawl teeth 174 that mesh with or otherwise engages the external gear teeth 151 of the drive gear 151 induced by the bias force.

The rear face 172 comprises a rib 175 that extends at least partially across the width of the pawl body 171, and itself has a generally concave outer surface or cross-section. Advantageously, the thickness of the pawl body 171 is greater at the rib 175 than other sections of the pawl body 171, which imparts a more robust structural configuration that enhances the overall strength of the pawl body 171. The robust structural configuration via the rib 175 protects against premature mechanical failure of the pawl body 171 during a ratcheting operation. In turn, the rib 175, providing additional thickness to the pawl body 171, serves to prolong the operational life of the pawl body 171. Advantageously, the added thickness of the pawl body 171 via the rib 175, facilitates even and consistent distribution of the bias force across the width of the pawl body 171, which is critical to ratchet functionality.

The pawl body 171 also includes a sidewall having linear outer peripheral surface 178. In an operative position of the pawl body 171 in the pawl pocket 133 of the ratchet head 130, the linear outer peripheral surface 178 engages the peripheral sidewall 131 of the ratchet head 130 in a manner that prevents radial movement of the pawl body 171 relative to the ratchet head 130. Advantageously, due to the linear structural configuration of the sidewall, the pawl body 171 moves linearly (not radially) relative to the ratchet head 130 during a ratcheting operation. In this way, engagement between the external gear teeth 151 and the external pawl teeth 174 is maintained during the ratcheting operation.

Figure 7:
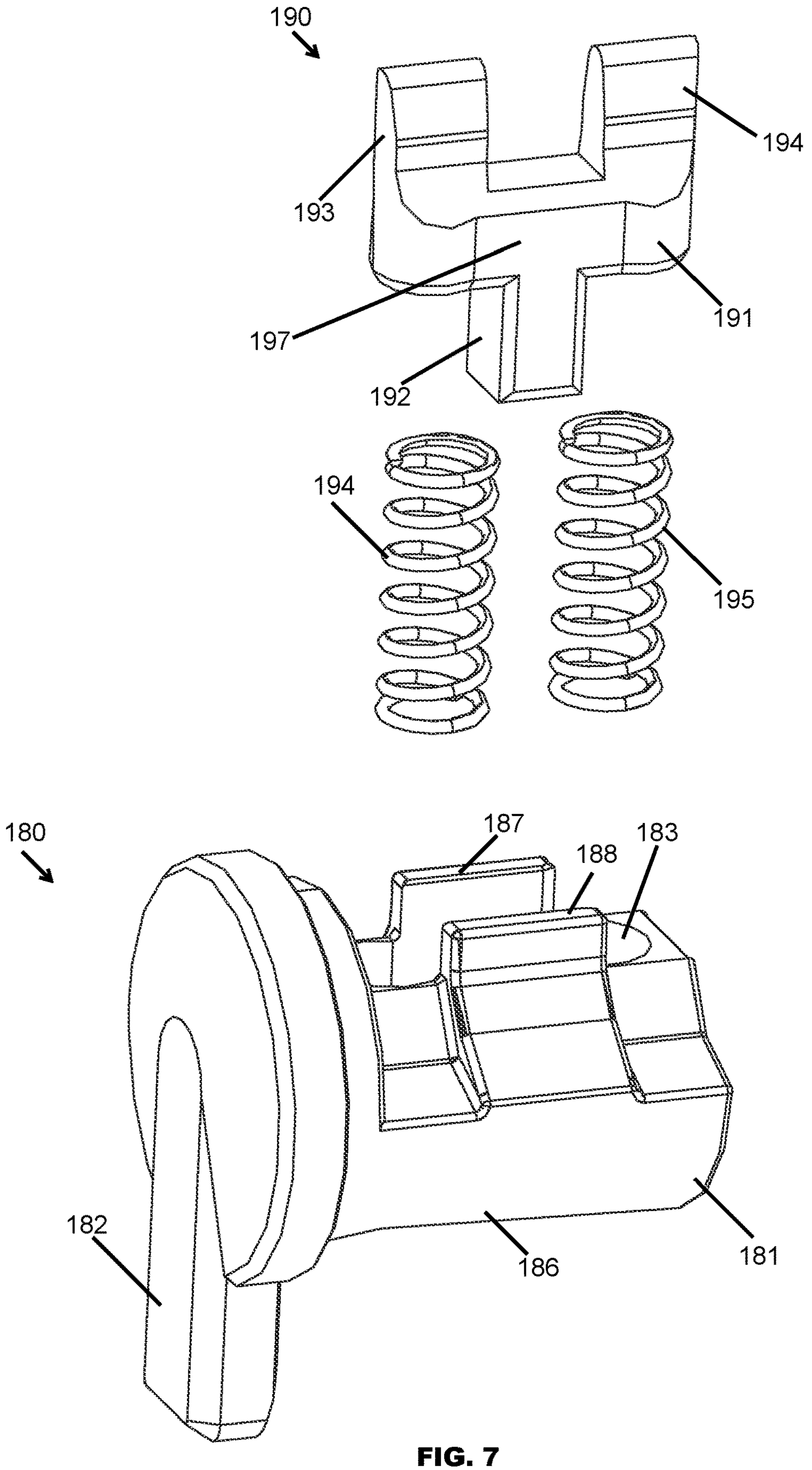
FIG. 7 illustrates an exploded view of a control member and a plunger assembly for the example ratchet tool of FIG. 1.
Figure 8:
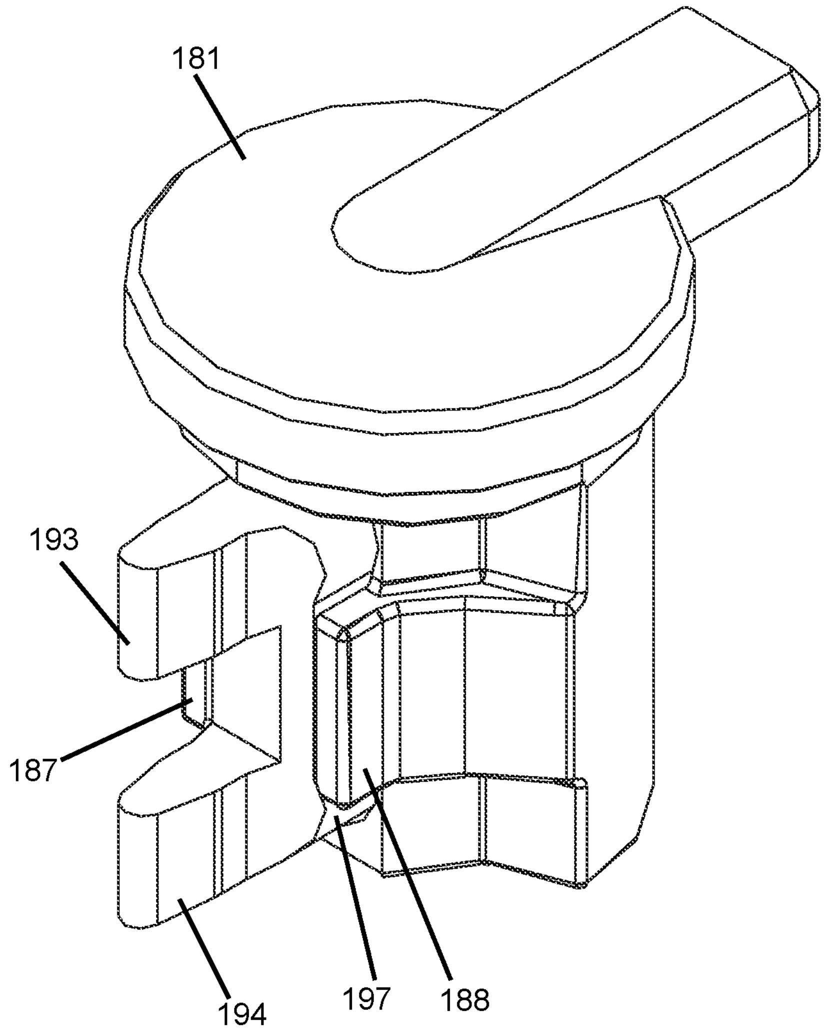
FIG. 8 illustrates the plunger assembly seated in the control member of FIG. 7.
Figure 9:
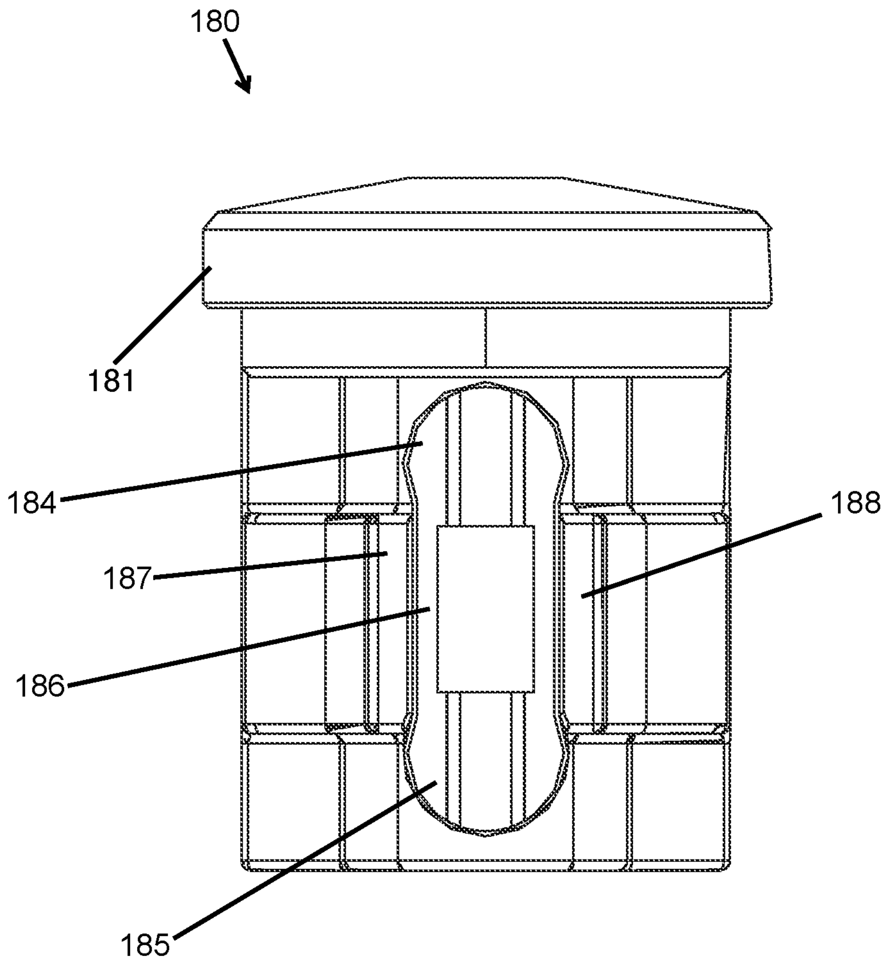
FIG. 9 illustrates a top view of the control member of FIG. 7.

As illustrated in FIGS. 7 through 9, the control member 180 comprises a switch lever having a switch body 181 that extends in operable for selective manipulation by the user to change a rotational drive direction of the drive gear 150. The switch body 181 has an internal space to receive at least a portion of the plunger body 191. The internal space comprises a first cylindrical pocket 184 which receives a first bias member 195, a second cylindrical pocket 185 which receives a second bias member 196, and a generally rectangular shaped recess 186 that extends between the first cylindrical pocket 184 and the second cylindrical pocket 185. In the illustrated example embodiment, the first bias member 195 and the second bias member 196 are formed as compression springs. Embodiments, however, are not limited thereto, and thus, this disclosure contemplates the first bias member 195 and the second bias member 196 encompassing other types of structural configurations that fall within the spirit and scope of the principles of this disclosure set forth herein.

The first cylindrical pocket 184 has a configuration that corresponds to the diameter of the first bias member 195, and second cylindrical pocket 185 has a configuration that corresponds to the diameter of the second bias member 196. The recess 186 has a configuration that corresponds to the thickness of the plunger body 191, and particularly, the lower prong 192 of the plunger body 191.

The switch body 181, which extends along a longitudinal axis of the switch lever, further comprises a pair of spaced apart wall extensions that include a first wall extension 187 and a first wall extension 188. The first wall extension 187 and the first wall extension 188 are spatially oriented in a direction that is perpendicular to the longitudinal axis to advantageously guide and maintain the position of the plunger body 191 in the internal space during a ratcheting operation. The first wall extension 187 and the first wall extension 188 also enables the plunger body 191 to transfer the bias force from the first bias member 195 and the second bias member 196 to the pawl body 171 during a ratcheting operation in a manner that provides even distribution of loading by the pawl body 171 to the gear body 151.

As illustrated in FIG. 10, the plunger body 191 comprises a lower prong 192 that terminates to a laterally extending cross member 197, and a pair of symmetrically oriented upper prongs 192, 193 that extend from the cross member 197 so as to be oriented substantially perpendicularly from the cross member 197. The lower prong 192 is received in the internal space (e.g., recess 186) of the switch body 181, and the pair of symmetrically oriented upper prongs 192, 193 are configured to engage the rear face 172 of the pawl body 171. The upper prongs comprise a first upper prong 193 and a second upper prong 194. The lower prong 192 is centrally positioned relative to the first upper prong 193 and the second upper prong 194, and rides within the internal space of the switch body 181 to locate and guide the first upper prong 193 and the second upper prong 194 as it moves in and out of the internal space of the switch body 181 during a ratcheting operation.

In an operating or assembled position of the plunger body 191 in the internal space of the switch body 181, the first upper prong 193 is spatially aligned with a central axis of the first bias member 195, and thus, is urged under the bias force of the first bias member 195 in a direction towards a first recessed surface 176 of the rear face 172 of the pawl body 171. Under the bias force, the first upper prong 193 transfers the bias force to the rear face 172 of the pawl body 171 at the first recessed surface 176. In an operating or assembled position of the plunger body 191 in the internal space of the switch body 181, the second upper prong 194 is spatially aligned with a central axis of the second bias member 196, and thus, is urged under the bias force of the second bias member 196 in a direction towards a second recessed surface 177 of the rear face 172 of the pawl body 171. Under the bias force, the second upper prong 194 transfers the bias force to the rear face 172 of the pawl body 171 at the second recessed surface 177. The constant transfer of bias force by the first upper prong 193 and the second upper prong 194 to the rear face 172 of the pawl body 171 causes and maintains even distribution of loading from the external pawl teeth 174 to the external gear teeth 151 during a ratcheting operation.

The terms "coupled," "attached," or "connected" can be used herein to refer to any type of relationship, direct or indirect, between the components in question, and can apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action can occur, either in a direct or indirect manner.

Those skilled in the art will appreciate from the foregoing description that the broad techniques of the embodiments of the present disclosure can be implemented in a variety of forms. Therefore, while the embodiments of this disclosure have been described in connection with particular examples thereof, the true scope of the embodiments of the disclosure should not be so limited since other modifications will become apparent to the skilled practitioner upon a study of the drawings and specification.

What is claimed is:

1. An interchangeable grip for a handle member of a hand tool, the interchangeable grip comprising:

a grip body configured for removable coupling to the handle member, the grip body having a cavity configured to receive and cover at least a portion of the handle member, a contact face at an end thereof, a plurality of grooves arranged on the contact face, and one or more internal ribs arranged on an inner wall within the cavity; and an end cap configured for removable coupling to the grip body and the handle member to facilitate removal of the grip body from the handle member, the end cap having a plurality of ribs extending radially outward for spatial alignment with the grooves for receipt therein, an opening configured to receive the handle member, and one or more end cap internal ribs located within the opening and extending radially inward towards the opening to couple the end cap to an axial groove formed in an outer surface of the handle member.

2. The interchangeable grip of claim 1, further comprising a fastener that extends through a second opening in the end cap and at least partially through the cavity in the grip body for connection to the handle member to prevent longitudinal movement between the handle member and the grip body in an assembled position of the grip body on the handle member, the second opening located coaxial to the opening in the end cap.

3. The interchangeable grip of claim 2, wherein the fastener comprises a screw having a threaded shaft portion that extends through the end cap for connection to the handle member.

4. The interchangeable grip of claim 1, wherein the grip body comprises a unitary structure.

5. The interchangeable grip of claim 4, wherein the unitary structure is formed, in whole or in part, of an overmolded material.

6. The interchangeable grip of claim 5, wherein the overmolded material comprises an elastomeric material or a non-elastomeric material.

7. The interchangeable grip of claim 1, wherein the grip body comprises a plurality of interconnected grip body sections.

8. A hand tool, comprising:

a handle member; and a grip body configured for removable coupling to the handle member, the grip body having a cavity configured to receive and cover at least a portion of the handle member, a contact face at an end thereof, a plurality of grooves arranged on the contact face, and one or more internal ribs arranged on an inner wall within the cavity; and an end cap configured for removable coupling to the grip body and the handle member to facilitate removal of the grip body from the handle member, the end cap having a plurality of ribs extending radially outward for spatial alignment with the grooves for receipt therein, an opening configured to receive the handle member, and one or more end cap internal ribs located within the opening and extending radially inward towards the opening to couple the end cap to an aft axial groove formed in an outer surface of the handle member.

9. The hand tool of claim 8, wherein the handle member comprises an intermediate region having an axial stop that engages the forward contact face to limits longitudinal advancement of the handle member in an assembled position of the handle member.

10. The hand tool of claim 9, wherein the axial stop has an outer diameter that is greater than an outer diameter of the handle member at the grip region.

11. The hand tool of claim 10, wherein the intermediate region has an outer surface with one or more forward axial grooves that facilitate the coupling between the handle member and the grip body.

12. The hand tool of claim 11, wherein the one or more axial grooves are configured to receive the ribs of the end cap to prevent rotation of the grip body relative to the handle member during operation of the hand tool.

13. The hand tool of claim 9, wherein the handle member comprises a grip region extending from the intermediate region for removable coupling to the grip body.

14. The hand tool of claim 8, further comprising a fastener that extends through a second opening in the end cap and at least partially through the cavity in the grip body for connection to the handle member to prevent longitudinal movement between the handle member and the grip body in an assembled position of the grip body on the handle member, the second opening located coaxial to the opening in the end cap.

15. A hand tool, comprising:

a tool head;

a handle member coupled to the tool head;

a grip body configured for removable coupling to the handle member, the grip body having a cavity configured to receive and cover at least a portion of the handle member, a contact face at an end thereof, a plurality of grooves arranged on the contact face, and one or more internal ribs arranged on an inner wall within the cavity; and an end cap configured for removable coupling to the grip body and the handle member to facilitate removal of the grip body from the handle member, the end cap having a plurality of ribs extending radially outward for spatial alignment with the grooves for receipt therein, an opening configured to receive the handle member, and one or more end cap internal ribs located within the opening and extending radially inward towards the opening to couple the end cap to an aft axial groove formed in an outer surface of the handle member.

16. The hand tool of claim 15, wherein the handle member comprises an intermediate region having an axial stop configured to engage the contact face and limit longitudinal advancement of the handle member relative to the grip body in an assembled position of the handle member.

17. The hand tool of claim 16, wherein the axial stop has an outer diameter that is greater than an outer diameter of the handle member at the grip region.

18. The hand tool of claim 17, wherein the intermediate region has an outer surface with one or more forward axial grooves that facilitate the coupling between the handle member and the grip body.

19. The hand tool of claim 18, wherein the one or more forward axial grooves are configured to receive the ribs of the end cap to prevent rotation of the grip body relative to the handle member during operation of the hand tool.

20. The hand tool of claim 16, wherein the handle member comprises a grip region extending from the intermediate region for removable coupling to the grip body.

* * * * *